(12) United States Patent
Biggs et al.

(10) Patent No.: US 8,312,938 B2
(45) Date of Patent: Nov. 20, 2012

(54) VERTIZONTAL GEOTHERMAL LOOP AND INSTALLATION METHOD

(75) Inventors: Terry R. Biggs, Noblesville, IN (US); Joseph A. Huck, Fortville, IN (US)

(73) Assignee: Williams Comfort Air, Inc., Carmel, IN (US)

( * ) Notice: Subject to any disclaimer, the term of this patent is extended or adjusted under 35 U.S.C. 154(b) by 0 days.

(21) Appl. No.: 13/227,902

(22) Filed: Sep. 8, 2011

(65) Prior Publication Data

US 2012/0000672 A1 Jan. 5, 2012

Related U.S. Application Data

(62) Division of application No. 12/536,723, filed on Aug. 6, 2009.

(51) Int. Cl.
*E21B 7/20* (2006.01)
(52) U.S. Cl. ............. 175/17; 166/302; 405/184; 165/45
(58) Field of Classification Search .................... 166/50, 166/302; 175/17; 405/184, 184.1, 184.2, 405/184.3; 165/45; 62/260
See application file for complete search history.

(56) References Cited

U.S. PATENT DOCUMENTS

| | | | | |
|---|---|---|---|---|
| 4,121,673 A | * | 10/1978 | Cherrington | .............. 175/61 |
| 4,915,452 A | * | 4/1990 | Dibble | .............. 299/17 |
| 5,109,932 A | * | 5/1992 | Bueter et al. | .............. 173/17 |
| 5,590,715 A | | 1/1997 | Amerman | |
| 5,634,515 A | | 6/1997 | Lambert | |
| 6,041,862 A | | 3/2000 | Amerman | |
| 6,112,833 A | | 9/2000 | Lambert | |
| 6,250,371 B1 | | 6/2001 | Amerman et al. | |
| 6,672,371 B1 | | 1/2004 | Amerman et al. | |
| 6,860,320 B2 | | 3/2005 | Johnson, Jr. et al. | |
| 6,920,924 B2 | | 7/2005 | Roesch et al. | |
| 7,387,174 B2 | * | 6/2008 | Lurie | .............. 175/57 |
| 2010/0139886 A1 | | 6/2010 | Desmeules | |
| 2011/0002740 A1 | | 1/2011 | Desmeules | |

FOREIGN PATENT DOCUMENTS

| | | |
|---|---|---|
| CA | 2 670 917 | 7/2009 |
| CA | 2639648 | 3/2010 |
| EP | 1006322 | 6/2000 |
| GB | 2436582 | 3/2007 |
| NL | 1006037 | 1/1999 |
| WO | WO 0014374 | 3/2000 |
| WO | WO 03060389 | 7/2003 |
| WO | WO 2010028496 | 3/2010 |

* cited by examiner

*Primary Examiner* — Giovanna Wright
*Assistant Examiner* — Richard Alker
(74) *Attorney, Agent, or Firm* — Woodard, Emhardt, Moriarty, McNett & Henry LLP

(57) ABSTRACT

A method and device for installing a tube of a geothermal closed loop system in the ground. A drill rod includes a hook for removably mounting the heat exchange tube for positioning the tube in the hole bored in the ground by the drill bit. The tube may be inserted into the bored hole once the drill is removed therefrom, mounted to the tube and then reinserted into the hole. Alternatively, the tube is mounted to the drill rod as the hole is being bored.

5 Claims, 5 Drawing Sheets

VERTIZONTAL GEOTHERMAL LOOP AND INSTALLATION METHOD

REFERENCE TO RELATED APPLICATION

This application is a divisional of U.S. patent application Ser. No. 12/536,723, filed Aug. 6, 2009, which is hereby incorporated by reference.

BACKGROUND OF THE INVENTION

1. Field of the Invention

The present invention relates generally to the field of devices and methods for installing geothermal closed loops in the ground.

2. Description of the Prior Art

Geothermal heating and cooling systems operate by exchanging heat between the constant temperature ground and a heat exchange medium circulated in a tube extending through the ground. In order to cool a building, heat within the building flows into the coolant medium within the tube extending from the building and through ground. The reverse is true when heating a building wherein heat from the ground flows into the coolant medium which is then circulated via the tube in the building with the heat flowing from the coolant tube into the building.

In an open loop system, existing ground water is used as the heat exchange medium which flows through the tube. The water may be obtained from a well, pond or lake or water located beneath ground.

In a closed loop system, the tube or pipe holding the heat exchange medium may be arranged in horizontal loops placed four to six feet below ground and installed using a backhoe along the length of each loop. A considerable amount of land is required to accommodate a horizontal system. Conventional boring machines allow the bored hole to extend downward into the ground and then upwardly exiting the ground at a distance located a great distance from the entrance to the hole. Once the drill head exits the hole, the heat exchange tube is mounted to the drill head and pulled back through the hole. To create a hole that extends downward and then horizontally and then upwardly requires a great horizontal distance due to the limitations of the boring machine. Alternatively, the tubes carrying the heat exchange medium may extend vertically for hundreds of feet below ground and installed by a well digging rig.

In the case of utilizing the above described open loop systems or closed loop systems, well digging machines, backhoes, and boring devices are brought onto the land for boring of the holes resulting in considerable damage to the turf and landscape. In many cases, the size of the lot may not allow sufficient room for the use of all of the equipment to create the holes. Further, the holes may extend horizontally such a great distance so as to extend beyond the boundary of the lot. On residential property landscaped prior to installation of a geothermal system, the resultant expense and mess caused by the hole boring machine presents a significant drawback to the installation of the geothermal system.

Disclosed herein is a device and method for installing a u-shaped tube into a single hole thereby minimizing the destruction to the landscape while also providing for a quicker installation minimizing the construction cost. Further, a small pit roughly five feet in width, length, and depth is created with the hole being bored at the bottom of the pit allowing the water, dirt, etc. to move upwardly from the bored hole into the pit. Once the u-shaped coolant tube is installed, the material may then flow from the pit into the hole thereby surrounding the tube and improving the heat transfer between the tube and the ground. A particular advantage results since the pit limits the amount of damage to the landscaped ground by containing the material from the boring process.

SUMMARY OF THE INVENTION

One embodiment of the present invention is a method of installing a tube of a geothermal closed loop system in the ground by using a rotatable drill rod with a drill bit for drilling a hole in the ground. The steps include creating a pit in the ground to receive water and dirt removed from drilling a blind hole in the ground. A drill rod is used to install a tube in the blind hole with the tube having an inlet portion and an outlet portion both extending out of the entrance of the blind hole.

A further embodiment of the present invention is a device for creating a geothermal closed loop using a U-shaped tube positioned in a blind hole in the ground. The tube has an inlet tubular portion and an outlet tubular portion extending out of the blind hole. The device includes a drill rod with a drill bit mounted to the drill rod; and, a mount on the drill end portion for mounting and holding the U-shaped tube but releasing the U-shaped tube as the drill end portion is pulled from the blind hole leaving the tube within the ground.

It is an object of the present invention to provide a new and improved method for installing a tube of a geothermal closed loop system into the ground.

A further object of the present invention is to provide a device for use in installing a u-shaped tube in the ground for use with a geothermal system.

Related objects and advantages of the present invention will be apparent from the following description.

DESCRIPTION OF THE PREFERRED EMBODIMENTS

Figure 1:
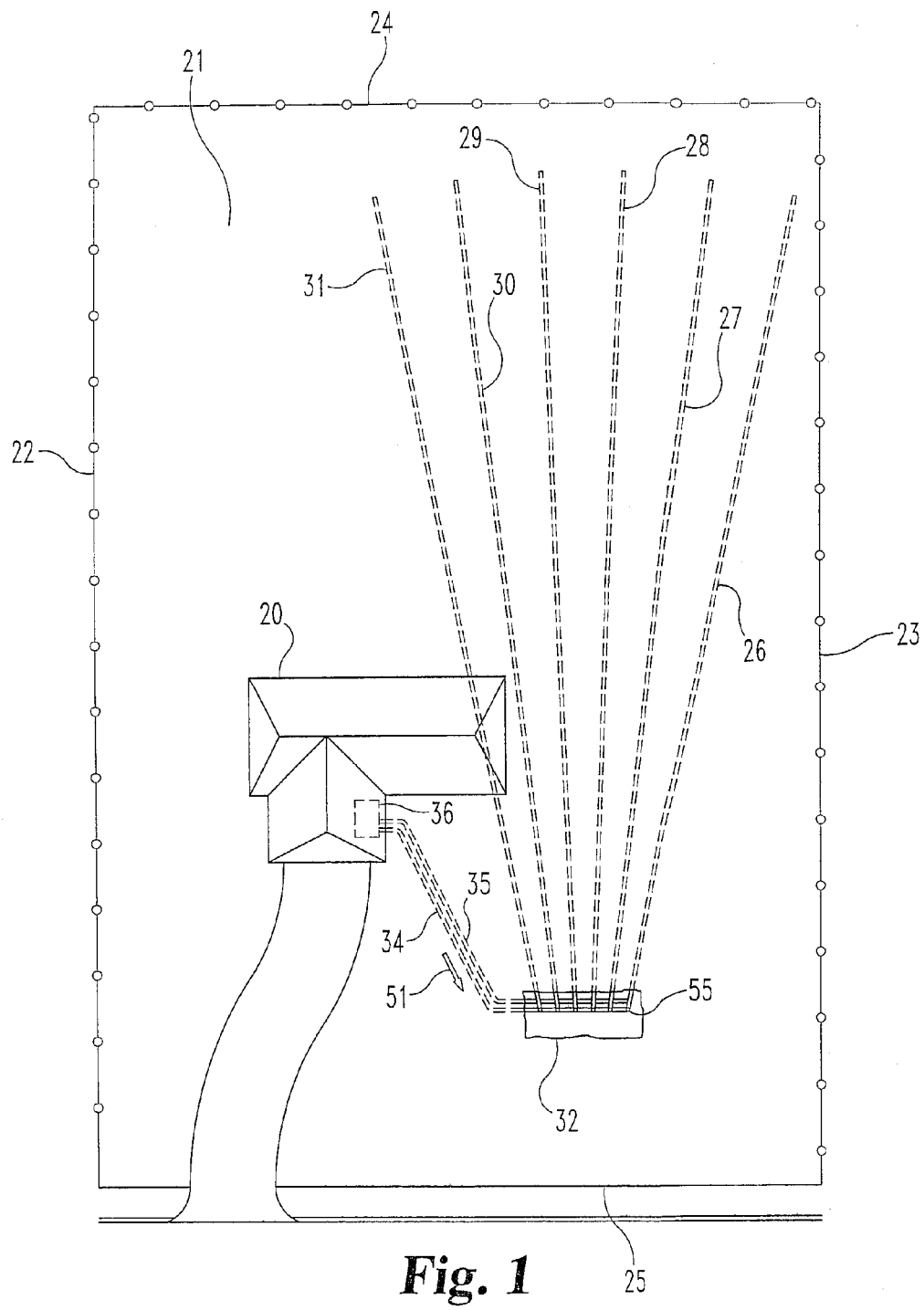
FIG. 1 is a top view of the geothermal system installed on a lot.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring to FIG. 1, there is shown a schematic top diagram of a geothermal system connected to a building. The building or house 20 is constructed on lot 21 having side boundaries on 22 and 23 along with end boundaries 24 and 25. A driveway extends from the building to the street or road. Six separate geothermal lines 26-31 extend beneath ground level and fan out from a pit 32. Each geothermal line 26-31 is formed by digging a blind hole into the ground with a separate geothermal tube positioned within each hole forming the geothermal lines 26-31. The tubes within the holes are then connected together funneling into an outlet tube 34 and an inlet tube 35 leading to a conventional heat exchanger 36 located within or adjacent building 20.

Pit 32 is formed by rolling back a 4×6 foot area of sod using conventional tools, such as, a backfill blade on an excavator. Pit 32 is then dug to a depth of five feet and provides a starting point for the six holes leading to the six geothermal lines 26-31. As each hole is dug, pit 32 provides a storage area for the removed dirt and water in a confined area and also allows material to drain back into each bored hole as needed to pack around u-shaped tubes inserted into the six bored holes.

Figure 2:
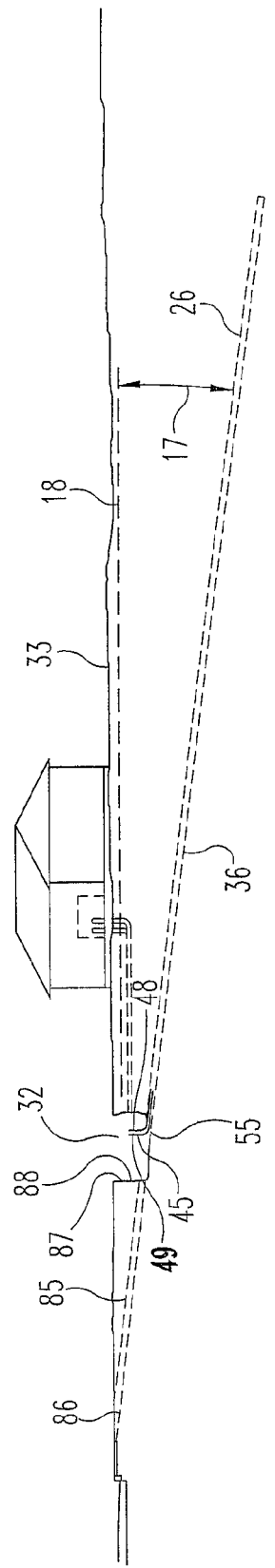
FIG. 2 is a side elevation view of geothermal line 26 located beneath the ground level.

While the drawings show a total of six geothermal lines, it is to be understood that the present invention includes less than or more than six lines depending upon the amount of heat exchange required for building 20. Typically, each line must be approximately 150 feet in length to provide one ton of air conditioning. In order to minimize the horizontal space occupied by the lines, the bored holes are drilled downward at an angle relative to horizontal. For example, in FIG. 2, line 26 includes a bored hole 36 at an approximate angle 17 of 19 degrees relative to a horizontal line 18. By extending the bored holes down at an acute angle relative to the horizontal, the length of the hole may be optimized given the limitation of the horizontal distance between the boundary lines 24 and 25 of the lot upon which the facility is located.

In many cases, rock formations are located beneath ground level 33. For example, in the event a rock formation or rock layer exists 100 feet below ground level, then if the bored holes are drilled only in a vertical direction, difficulty is incurred for drilling of a 150 foot hole as the drill bit drills through the rock. Thus, by orienting the bored hole at an acute angle relative to horizontal, difficulties may be avoided from a rock formation while also maximizing the length of the hole relative to the boundaries of the lot. In the event the bored holes extend beyond the lot boundary line, then covenants may limit the sizing of the length of the hole. The method of the present invention therefore includes the step of orienting the drill rod with attached drill bit at an acute angle relative to horizontal as the hole is drilled in the ground. In order to determine angle 17, the desired length of the bored hole must first be selected with the acute angle then being calculated given the desired length and either the horizontal distance, permissible by the lot boundaries, of the desired bored hole or the vertical distance, permissible by the depth of rock formations, beneath ground to which the hole is to extend.

Since pit 32 is only four to six feet across and five feet deep, it is necessary to start boring the hole at a distance from the pit in order to orient the hole at a 19 degree angle relative to horizontal. Thus, the drill bit is rotated into the ground at location 86 (FIG. 2) apart from the hole creating a 19 degree hole 85 which enters the pit side wall 87 at location 88. The drill bit continues to rotate and moves into the pit engaging the bottom wall of the pit creating entrance 55 of hole 36 also oriented at a 19 degree angle relative to the horizontal. It is desirable that hole 55 be created in the bottom wall of the pit in order to allow the material from the hole to exit the hole into the pit and eventually move back into the hole once the heat exchange tube is located in the hole.

Figure 3:
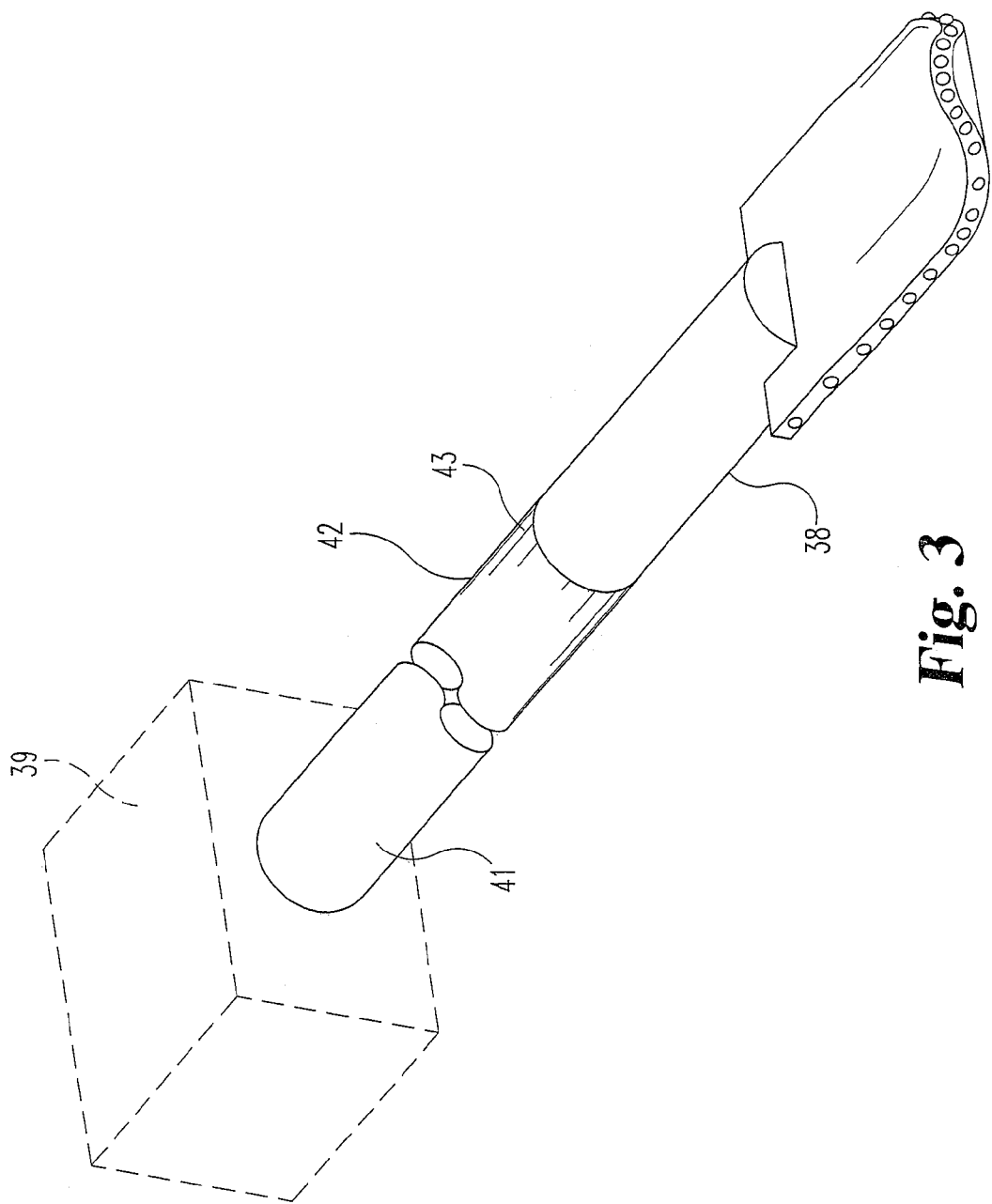
FIG. 3 is a fragmentary perspective view of a conventional drill used in drilling a geothermal hole for use in practicing the preferred embodiment of the present invention.

Referring to FIG. 3, drill rod 42 has one end 41 attached to a conventional hole boring machine 39 such as available from Vermeer Corporation of Pella, Iowa. Machine 39 has a rotatable output releasably connected to end 41 of rod 42 with the opposite end 43 of the rod connected to a conventional drill bit end portion 38. In the preferred embodiment shown in FIG. 3, rod 42 and drill bit end portion 38 are rotated by machine 39 through the bottom of pit 32 (FIG. 2) creating a hole approximately four inches in diameter at a 19 degree angle depending upon the conditions of the ground. Each line is sized for approximately one ton of cooling/heating for the geothermal system installed. The entrance 55 of the hole 36 associated with line 26 is provided at the bottom of pit 32. Likewise, each hole created for lines 27-31 has a separate entrance.

Figure 4:
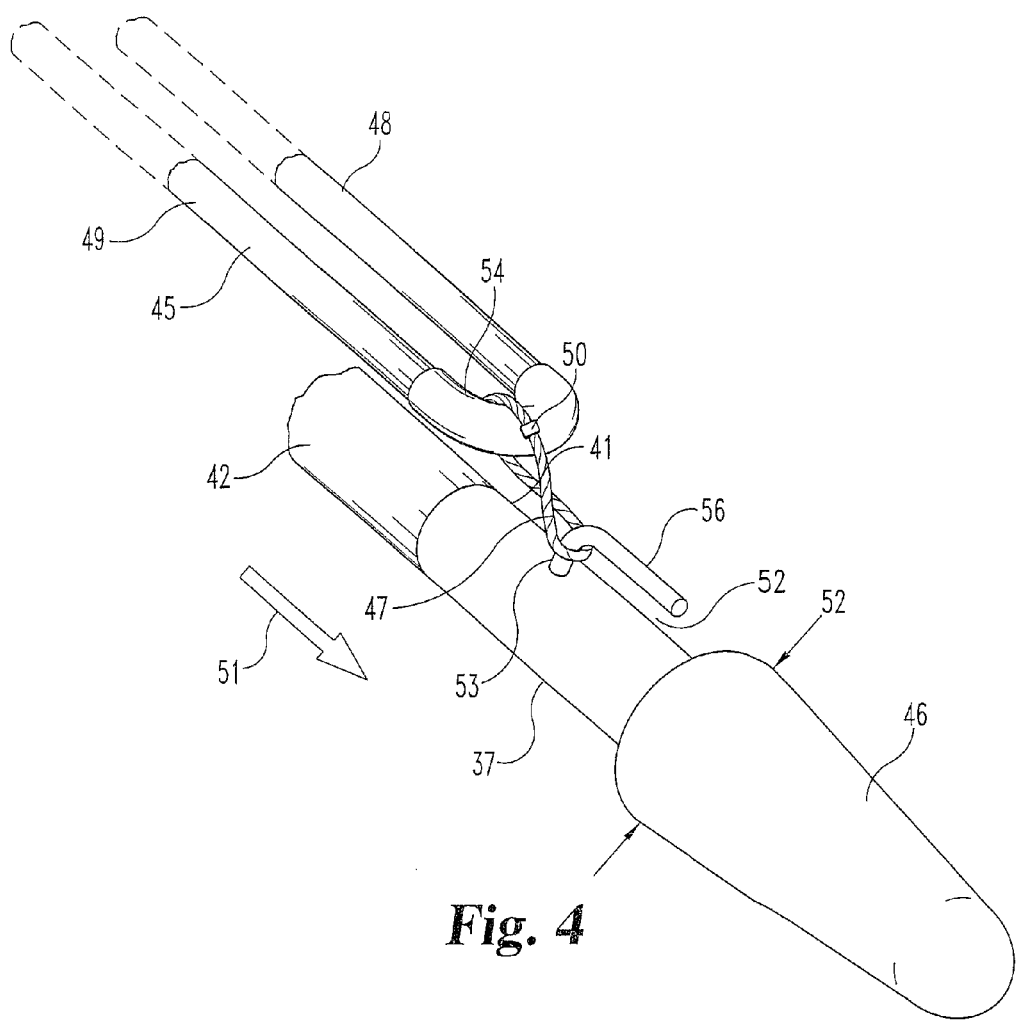
FIG. 4 is a fragmentary perspective view with the u-shaped tube attached to the drill end portion having a cone shaped closed end used in practicing the preferred embodiment.

Once a hole is created, the drill rod 42 and drill bit 38 are removed from the hole. Drill bit 38 is then unthreaded from rod 42 and a drill end portion 37 having a cone shaped closed end 46 (FIG. 4) is mounted to rod 42. Bit 38 and end portion 37 have an internally threaded socket into which the external threaded male end of rod 42 extends.

A hooked shaped arm 56 has a proximal end 53 mounted to end portion 37 and forms an open end 52 facing away from rod 42. Arm 56 is used to pull the u-shaped tube 45 (FIG. 4) into the hole once the hole has been bored and the drill rod 42 with end portion 37 is inserted into the hole. After end 46 reaches the blind end of the hole, the rod 42 with end portion 37 is pulled outward leaving the u-shaped tube 45 within the hole.

The u-shaped coolant tube 45 is mounted to the arm 56 by any number of fastening means. For example, a cable 47 is extended through the space between tube portion 48 and tube portion 49 of tube 45. The cable is extended around arm 56 between the space existing between arm 56 and the main body of end portion 37. A conventional cable clamp 50 then joins the opposite ends of cable 47 securing the u-shaped tube 45 to rod 42 by hooking the tube 45 to arm 56. So long as rod 42 and end 46 move downward into the bored hole, the arm 56 is operable to pull tube 45 into the hole. Once the drill rod 42 is moved in a direction opposite to arrow 51, cable 47 moves through open end 52 of arm 56 thereby disengaging cable 47 and tube 45 from the arm leaving in place, within the hole, tube 45 while the drill rod and drill end portion are completely removed from the bored hole. Excellent results have been obtained by using a 3/16 inch braided cable for cable 47. The width of the cone shaped end 46 must be smaller than the diameter of drill bit end portion 38 so that the bored hole is sufficiently large relative to cone shaped end 46 to prevent interference of end 46 with tube 45 as end 46 is pulled outward from the hole.

The opposite end portions 48 and 49 (FIG. 2) of tube 45 extend outward through the entrance 55 of the bored hole and are connected to lines 34 and 35, in turn, connected to heat exchanger 36 (FIG. 1). The opposite end portions 45 and 49 are connected together by joint coupler 54. Thus, the heat exchange medium is circulated through outlet tube 34 in the direction of arrow 51, through the tube portion 49 and then back through coupler 54 through tube portion 48 in the direction opposite of arrow 51 to tube 35, in turn, connected to the heat exchanger.

In a similar fashion, a hole is bored for line 27 and then line 28 etc. until all of the bored holes are completed as just described with the drill rod and drill bit then being withdrawn sequentially from each bored hole with a separate u-shaped tube connected to arm 56 and inserted into each bored hole thereby forming geothermal lines 26-31. As each u-shaped tube is inserted in the particular bored hole, the water and dirt within the pit is allowed to flow back into the bored hole. Once the inlet tube portion and outlet tube portion of each of the six u-shaped tubes 45 are connected respectively to tubes 34 and 35, pit 32 may be filled with the sod being replaced. Each of the bored holes forming lines 26-31 has a bottom blind end against which each coupler 54 may rest. A universal coupler is used to join the end portions 49 to line 34 and end portions 48 to line 35.

Figure 5:
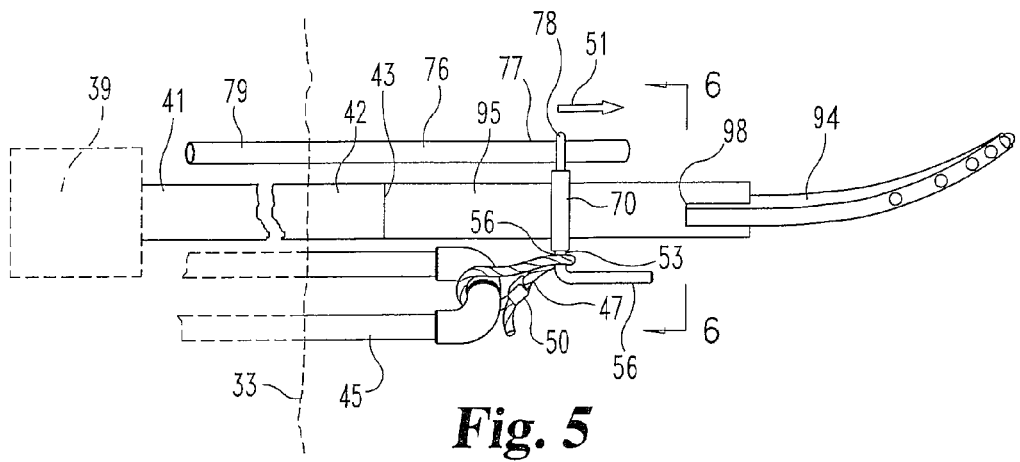
FIG. 5 is a fragmentary side view of the drill rod connected by a bearing to the heat exchange tube and an evacuation tube used to practice the method disclosed herein all according to the alternate embodiment of the present invention.
Figure 6:
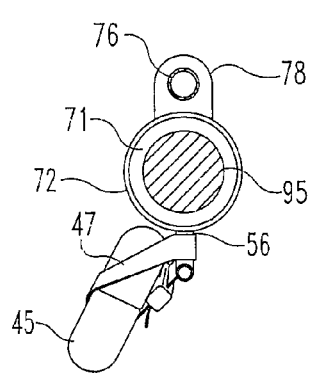
FIG. 6 is an enlarged cross-sectional view taken along the line 6-6 of FIG. 5 and viewed in the direction of the arrows.

An alternate embodiment for installing a geothermal closed loop employs the tool shown in FIGS. 5 and 6. The tool allows for the u-shaped tube to be installed into the bored hole at the same time the hole is being created thereby eliminating one of the steps of the previously described method. Further, the drill bit is not removed from the drill rod. Thus, drill rod 42 (FIG. 5) has one end 43 connected to drill end main body 95 whereas the opposite end 41 is connected to boring machine 39. A bearing 70 has an inner race 71 (FIG. 6) fixedly secured to the drill end main body 95 to prevent relative motion between race 71 and the drill rod and drill end main body. The bearing includes an outer race 72 which freely rotates on race 71. Bearing 70 employs conventional bearing construction techniques and is commercially available. Fixedly mounted to the outer race 72 of bearing 70 is arm 56 having its proximal end 53 fixedly secured to race 72. Cable 47 mounts the u-shaped tube 45 to arm 56 in an identical manner as previously described. Thus, with rod 42 and drill end main body 95 rotating, outer race 72 will remain stationary thereby allowing tube 45 to be in a non-rotating condition.

A ¾ inch hose 76 has a proximal end 77 mounted by a conventional clamp 78 to the outer race 72. The opposite end 79 of hose 77 extends outward from the entrance 55 of the hole and it is connected to a conventional pump to facilitate extraction of water and dirt from the hole as the hole is being bored and to also allow the pump to force the water and dirt back into the bored hole as the drill rod and drill bit are removed. Each hole is drilled by rotating rod 42 and drill bit main body 95 while at the same time carrying the u-shaped tube 45 into the bored hole being created. End 98 of drill bit main body 95 is fixedly attached to a conventional flat drill bit 94 to rotate therewith.

The blind holes are formed in a manner identical as previously described. For example, bored hole 36 has an entrance 55 located at the bottom of pit 32 and is angularly positioned relative to the horizontal at angle 17. The length of the bored hole and the acute angle 17 are calculated as previously described. Drill bit 94 advances into the ground creating the bored hole with the u-shaped tube 45 pulled into the hole behind the drill bit at the same time that the hole is being bored. Once drill bit 94 reaches the desired length of the bored hole creating a blind hole end, the drill bit and drill rod are pulled in a direction opposite of arrow 51 thereby allowing the u-shaped tube to remain in the bored hole since cable 47 disengages arm 56.

Figure 7:
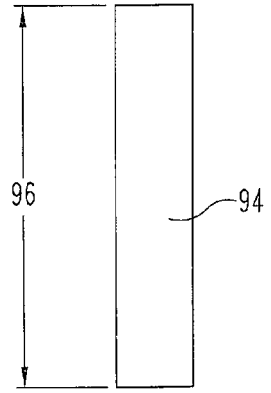
FIG. 7 is an enlarged end view of the boring head shown in FIG. 5.

Drill bit 94 (FIG. 7) has a flat blade boring head operable to bore a hole having a diameter equal to the length 96 of the blade. Thus, the hole is sized to allow for movement of tubes 45 and 76 into the hole as it is bored. When withdrawing the blade from the hole it may be necessary to rotate the blade until the blade is past the tube 45 which remains in the hole. Since hose 76 is fixedly fastened to the outer bearing race 72, the hose is withdrawn from the bored hole along with the drill rod and drill bit.

Commercially available monitors are available for locating and for determining the depth and horizontal distance the drill bit extends. Likewise, the angular position of the drill bit about its longitudinal axis may also be determined by such monitors. For example, Digital Controls, Inc., Kent, Wash. distributes a directional drill locating system under the model, name and number Digitrack F2. The Digitrack F2 directional drill locating systems includes a sensor mountable within the drill rod that is operable to transfer back to a remote monitor the roll, pitch, signal strength, temperature and real time as well as indicate the horizontal distance of the drill bit from the monitor and the depth beneath the ground. The drill rod, drill bit and hose are extracted from the bored hole while the slurry water mixture is pumped back into the bored hole ensuring the void in the soil is completely filled.

While the invention has been illustrated and described in detail in the drawings and foregoing description, the same is to be considered as illustrative and not restrictive in character, it being understood that only the preferred embodiments has been shown and described and that all changes and modifications that come within the spirit of the invention are desired to be protected.

What is claimed is:

1. A method of installing a heat exchange tube of a geothermal closed loop system in the ground using a rotatable drill rod having a drill rod end portion and a drill bit for drilling a blind hole in the ground comprising the steps of:
    creating a pit in the ground to receive water and dirt removed from drilling the blind hole in the ground;
    selecting a drill bit having a blade having a size to create the blind hole;
    rotating the drill rod with the drill bit attached thereto;
    moving the drill rod with drill bit into the ground via the pit during the rotating step creating the blind hole having an entrance in the ground and a blind end;
    using the drill rod to install the heat exchange tube in the blind hole with the tube having an inlet portion extending via the entrance into the blind hole and an outlet portion extending via the entrance out of the same blind hole;
    attaching the tube to the drill rod prior to said moving step so that the drill rod, drill bit and tube are moved into the ground together while the blind hole is being created;
    restraining the tube from rotating as the drill rod and drill bit are rotated in the blind hole;
    providing a bearing on the drill rod with the bearing having an inner race, an outer race, and a first mount and a second mount on the outer race;
    removably mounting the tube to the first mount prior to said moving step on the outer race of the bearing to keep the tube from rotating while the drill rod rotates;
    providing a hose to remove water and dirt from the hole and into the pit during the drilling of the hole and also to force back into the hole water and dirt in the pit as the hose is withdrawn;
    mounting the hose to the second mount prior to said moving step so that the drill rod, drill bit, tube and hose are moved into the ground together while the blind hole is being created with the hose and tube located on the outer race to fit within the hole being created by said blade of said size;
    withdrawing water and dirt from the blind hole via the hose while the drill rod is creating the blind hole; and,
    withdrawing the drill rod, drill bit and hose from said hole while leaving the tube within the hole;
    forcing water and dirt back though the hose into the blind hole after the blind hole is created and as the drill rod, drill bit, and hose are withdrawn from the hole.

2. A device for creating a geothermal closed loop using a U-shaped tube positioned in a blind hole in the ground with the tube having an inlet tubular portion and an outlet tubular portion extending out of the blind hole comprising:
- a rotational drill rod having a drill end portion, said drill end portion having a blade sized for creating the blind hole;
- a single U-shaped tube having an inlet tubular portion and outlet tubular portion for circulating a medium therein;
- a single hose to both remove water and dirt from the hole being drilled and for forcing water and dirt back into the hole once drilled;
- a bearing on said drill rod having a first mount removably holding the U-shaped tube in a non-rotating position and a second mount fixedly holding said hose in a non-rotating position as the blind hole is being created by rotating the rotational drill rod and drill end portion but releasing the U-shaped tube as the drill rod and drill end portion are pulled from the blind hole leaving the tube within the ground.

3. The device of claim 2 wherein:
said first mount is a hook having an open end and said second mount is a clamp; and,
said bearing has an inner race fixedly mounted to said drill rod and an outer race upon which said first mount and said second mount are secured.

4. The device of claim 3 and further comprising:
a connector extending between said inlet tubular portion and said outlet tubular portion of the tube and also between said hook and said drill rod with said cable disengaging said hook via said open end as said drill rod is pulled from said blind hole leaving the tube in the blind hole.

5. A method of installing a heat exchange tube of a geothermal closed loop system in the ground using a rotatable drill rod having a drill rod end portion and a drill bit for drilling a blind hole in the ground comprising the steps of:
- creating a pit in the ground to receive water and dirt removed from drilling the blind hole in the ground;
- selecting a drill bit having a blade sized to create the blind hole;
- rotating the drill rod with the drill bit attached thereto;
- moving the drill rod with drill bit into the ground via the pit during the rotating step creating the blind hole having an entrance in the ground and a blind end;
- using the drill rod to install the heat exchange tube in the blind hole with the tube having an inlet portion extending via the entrance into the blind hole and an outlet portion extending via the entrance out of the same blind hole;
- attaching the tube to the drill rod prior to said moving step so that the drill rod, drill bit and tube are moved into the ground together while the blind hole is being created;
- restraining the tube from rotating as the drill rod and drill bit are rotated in the blind hole;
- providing means on the drill rod to removably hold the tube in a non-rotating condition as the drill rod rotates;
- removably mounting the tube to the means prior to said moving step;
- providing a single hose to remove water and dirt from the hole and into the pit during the drilling of the hole and also to force back into the hole water and dirt from the pit as the hose is withdrawn;
- mounting the hose to the means prior to said moving step so that the drill rod, drill bit, tube and hose are moved into the ground together while the blind hole is being created with the hose and tube located on the means to fit within the hole being created by the blade of said size;
- withdrawing water and dirt from the blind hole via the hose while the drill rod is creating the blind hole; and,
- withdrawing the drill rod, drill bit and hose together from said hole while leaving the tube within the hole;
- forcing water and dirt back though the hose into the blind hole after the blind hole is created and as the drill rod, drill bit, and hose are withdrawn from the hole.

* * * * *